Sept. 17, 1963 J. H. VOGELMAN 3,104,393

METHOD AND APPARATUS FOR PHASE AND AMPLITUDE CONTROL IN IONOSPHERIC COMMUNICATIONS SYSTEMS

Filed Oct. 18, 1961 4 Sheets-Sheet 1

INVENTOR.
JOSEPH H. VOGELMAN

BY Wade Koontz and
Willard R. Matthews Jr
ATTORNEYS

Sept. 17, 1963 J. H. VOGELMAN 3,104,393

METHOD AND APPARATUS FOR PHASE AND AMPLITUDE CONTROL IN IONOSPHERIC COMMUNICATIONS SYSTEMS

Filed Oct. 18, 1961 4 Sheets-Sheet 2

INVENTOR.
JOSEPH H. VOGELMAN

BY Walter Lowe
Willard R. Matthews, Jr.
ATTORNEYS

INVENTOR.
JOSEPH H. VOGELMAN
BY Wade Koontz and Willard R. Matthews, Jr.
ATTORNEYS Sept. 17, 1963 J. H. VOGELMAN 3,104,393

METHOD AND APPARATUS FOR PHASE AND AMPLITUDE CONTROL IN IONOSPHERIC COMMUNICATIONS SYSTEMS

Filed Oct. 18, 1961 4 Sheets-Sheet 4

INVENTOR.
JOSEPH H. VOGELMAN
BY Wade Koontz and Willard R. Matthews Jr.
ATTORNEYS 3,104,393

METHOD AND APPARATUS FOR PHASE AND AMPLITUDE CONTROL IN IONOSPHERIC COMMUNICATIONS SYSTEMS

Joseph H. Vogelman, Roslyn, N.Y., assignor to the United States of America as represented by the Secretary of the Air Force Filed Oct. 18, 1961, Ser. No. 146,049
4 Claims. (Cl. 343—200)
(Granted under Title 35, U.S. Code (1952), sec. 266)

The invention described herein may be manufactured and used by or for the United States Government for governmental purposes without payment to me of any royalty thereon.

This invention relates to communication systems, and more particularly, to a method and apparatus for compensating for phase shift and amplitude irregularities which occur when a wideband of frequencies is transmitted in the ionospheric scatter mode.

In the ionospheric scatter mode the multipath and the phase irregularities of the transmission medium restrict the coherent bandwidth at radio frequencies to about 500 cycles. Transmission of sideband information, such as voice or high speed data in a high reliability communication system therefore, becomes impossible since the medium makes the message unintelligible.

Accordingly, it is a principal object of my invention to provide a novel method for transmitting sideband information in the ionospheric scatter mode.

It is another object of my invention to provide, in a high reliability communication system, apparatus adapted to automatically compensate for phase and amplitude irregularities due to the multipath and transmission medium of the ionosphere.

It is still another object of my invention to provide, in a high reliability communication system, a novel modulation and demodulation method adapted to remove irregularities introduced by the ionosphere.

Other objects, advantages and characteristics of the invention will be apparent from the description which follows and the accompanying drawings in which.

Figure 1:
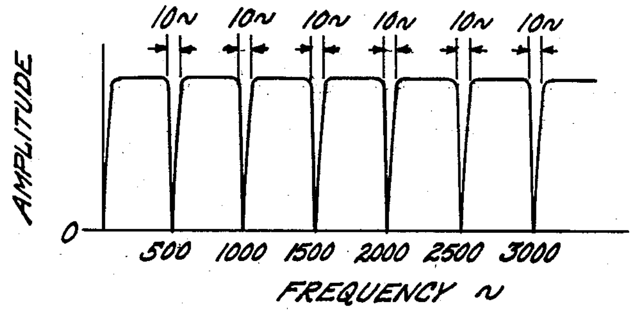
FIGURE 1 illustrates a modified response curve of the audio frequency spectrum in accordance with the principles of my invention.

In general, the novel concepts of my invention comprise dividing the frequency spectrum of the signal to be transmitted into a plurality of segments, combining with each of said segments a control signal of known phase and amplitude, transmitting said composite signal to a remotely located receiver, and controling the received signal segments in accordance with the phase and amplitude relationships of said control signals.

More specifically, in one presently preferred embodiment, the 300 to 3,300 cycle voice bandwidth spectrum is passed through a filter which removes 10 cycles of bandwidth at frequencies 500 cycles apart. In the instant example, these 10 cycle gaps occur between 495 and 505 cycles, 995 and 1,005 cycles, 1,495 and 1,505 cycles, 1,995 and 2,005 cycles, 2,495 and 2,505 cycles, and 2,995 and 3,005 cycles, as illustrated by response curve of FIG. 1.

Figure 3:
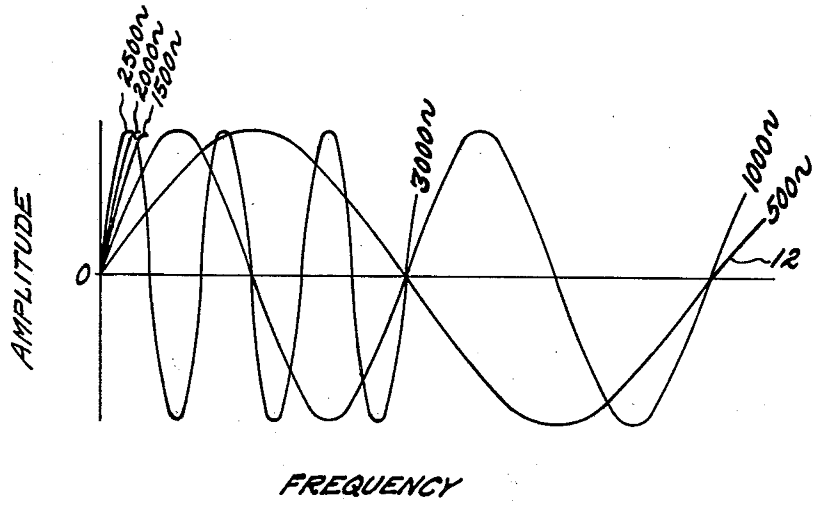
FIGURE 3 illustrates the phase and amplitude relationships of said control signals.

From a highly accurate and stable frequency source, control signal sine waves at 500, 1,000, 1,500, 2,000, 2,500 and 3,000 cycles are produced in such a manner that each of the waves are harmonically related and cross the *x*-axis at identically the same time and increase in the same direction as the lowest frequency sine wave. These control signals are illustrated in their proper relationships by wave forms 12 through 17 of FIGURE 3.

Figure 2:
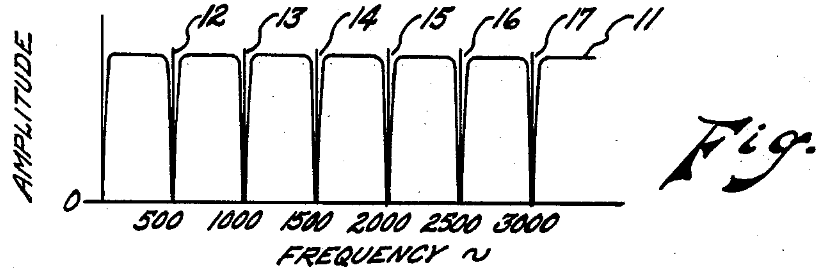
FIGURE 2 illustrates the response curve of FIGURE 1 in combination with certain control signals as comprehended by my invention.

The output of the filter is combined with the control sine waves, and the composite signal, as illustrated by FIGURE 2, is applied to a standard single sideband modulator to produce the modulated radio frequency wave to be transmitted. At the receiver end this composite signal is detected by a conventional single sideband demodulator. The received signal, however, is highly distorted by the ionospheric scatter phase irregularities. To restore the signal to its original form, the apriori knowledge of the existence of the harmonically related sine wave components and their phase relationships are used. The composite wave is divided into equal parts by a series of filters, each part containing one of the control sine waves. The sine wave is separated from the rest of the signal and compared in amplitude and phase to the amplitude and phase of the lowest frequency sine wave. By using appropriate automatic gain control and phase correcting networks, the phase and amplitude of the signal in that segment is corrected to equal amplitude and identical zero crossing. All segments are processed in the identical manner and then combined, less the harmonically related sine wave portions, to reproduce the original signal.

Figure 4:
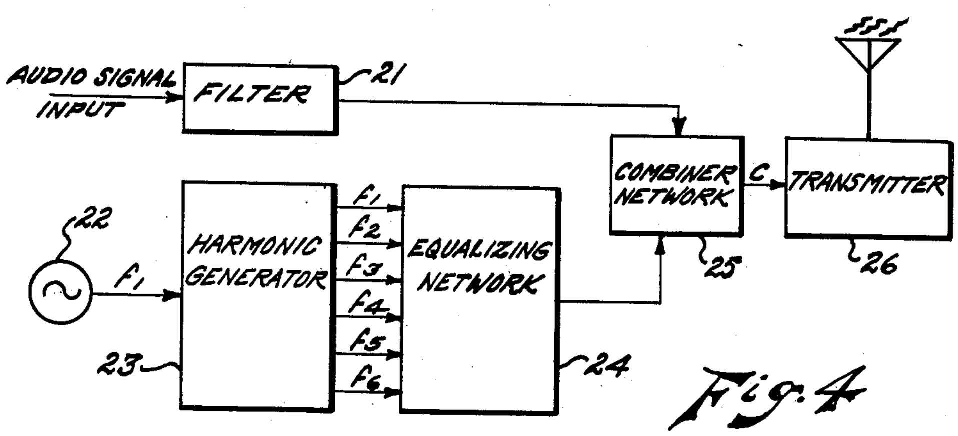
FIGURE 4 is a block diagram of the modulator stage of my invention.

Referring now to FIGURE 4 the audio modulated signal is passed through filter 21 where harmonics of the control frequency are removed. Wave form 11 of FIGURE 1 shows the output of this filter to have a flat response everywhere except at the 500, 1000, 1500, 2000, 2500 and 3000 cycle control frequencies. Frequency $F_1$ from highly stable frequency source 22 is fed to harmonic generator 23 which, in combination with equalizing network 24, produces phase coherent frequencies $F_1$ through $F_6$.

Control signals $F_1$—$F_6$ from equalizing network 24, together with the audio information signal from filter 21, are combined in combiner network 25 and then applied to the transmitter equipment. The output wave from of combiner 25 is illustrated in FIGURE 2. This output is a combination of the information signal as modified by the filter and sine wave signals $F_1$—$F_6$.

Figure 5:
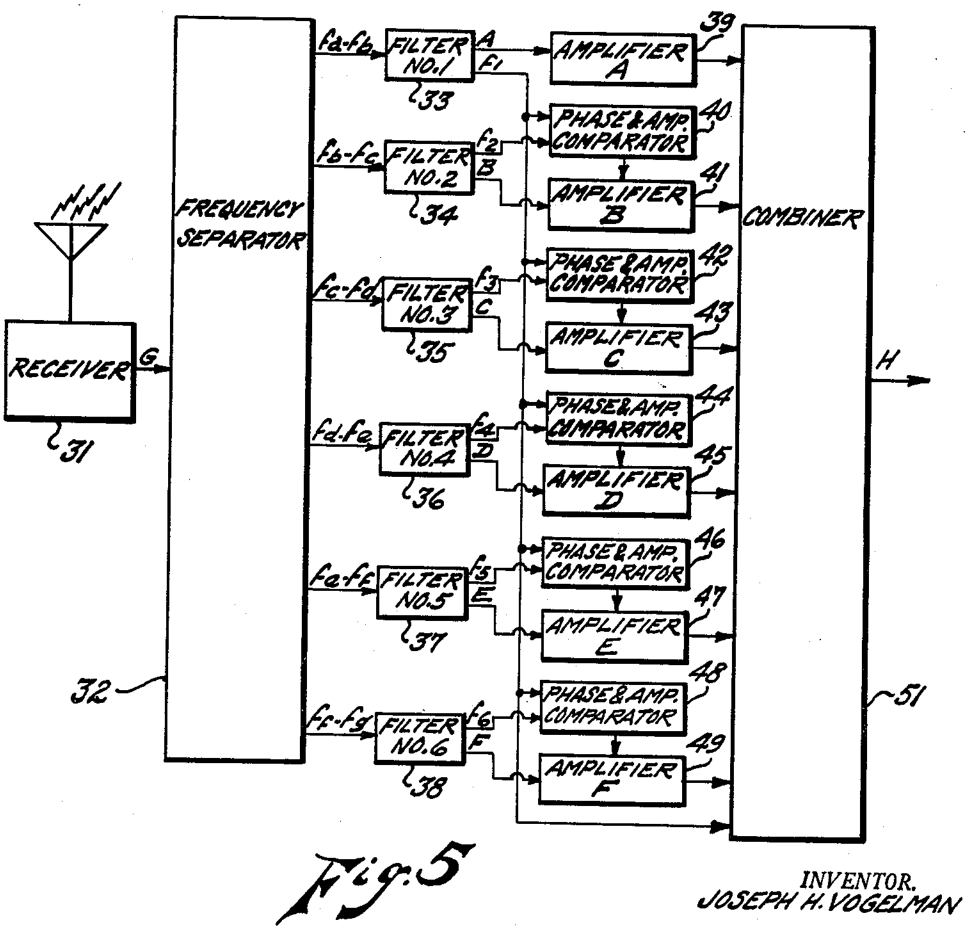
FIGURE 5 is a block diagram of the demodulator stage of my invention.

Referring now to FIGURE 5, the signal at the output of receiver 31 is fed to frequency separator 32 which divides the frequency band into intervals $F_a$—$F_b$; $F_b$—$F_c$; $F_c$—$F_d$; $F_d$—$F_e$; $F_e$—$F_f$; and $F_f$—$F_g$. The outputs of frequency separator 32 are then fed to filters 33—38. Two outputs are obtained from each of these filters—the control frequencies $F_1$—$F_6$, and the signal outputs designated in FIGURE 5 as A, B, C, E, and F. The control signal $F_1$ furnishes a reference as to phase and amplitude for comparison with the control signals $F_2$, $F_3$, $F_4$, $F_5$, and $F_6$. Information signal A is fed through amplifier 39 to combiner 51. Control channel $F_2$ is compared in phase and amplitude in phase-and-amplitude-comparator 40, producing an automatic gain control signal and a phasing signal which are used to adjust the phase-and-amplitude to amplifier 41. Information signals C, D, E and F are treated in a similar manner. These outputs are each fed from the amplifiers to the combiner where the phase and amplitude corrected signals are combined to form a faithful reproduction of the original signal at output H.

Figure 6:
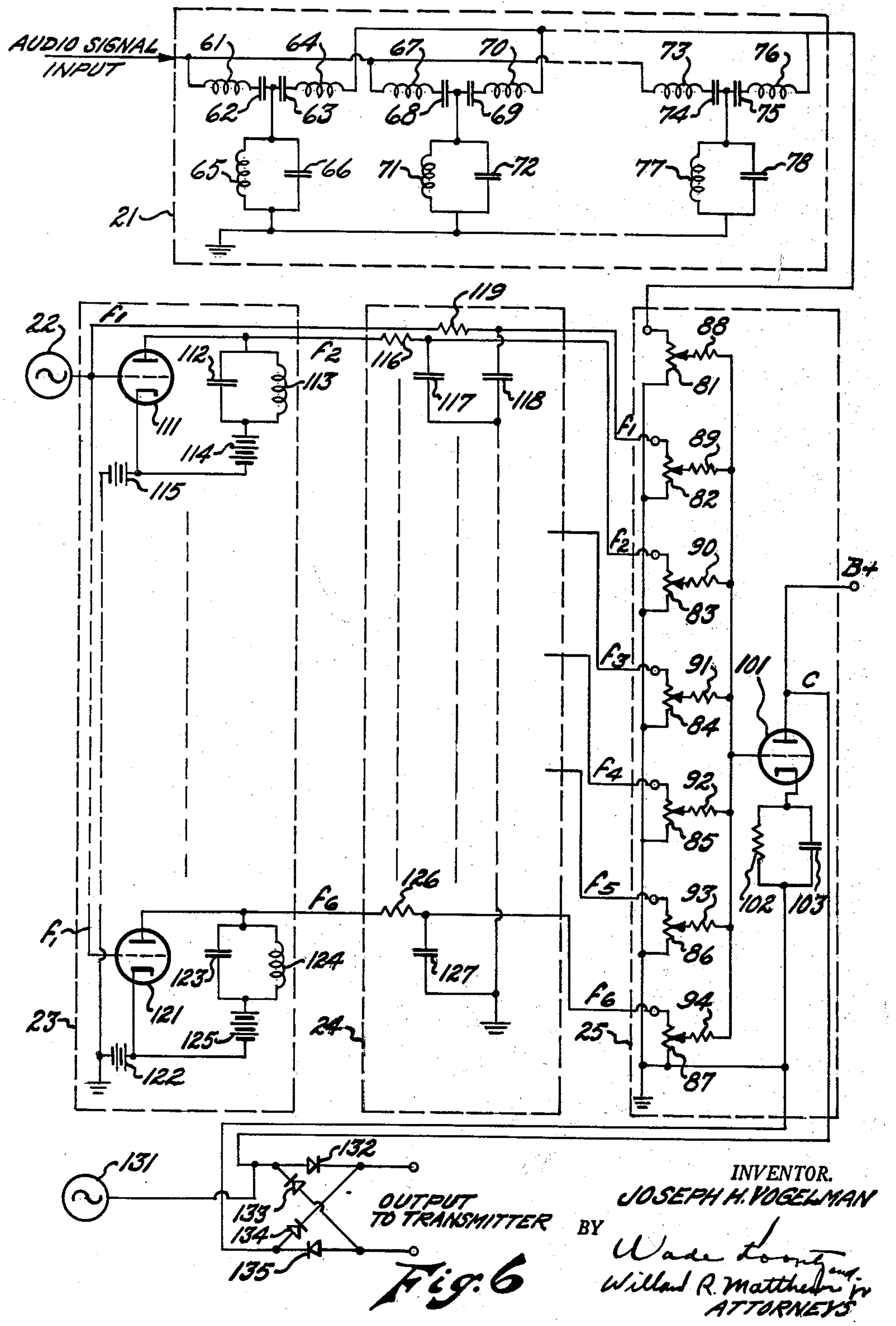
FIGURE 6 is a schematic diagram of the modulator stage of my invention.

With reference to FIGURE 6 there is illustrated a schematic diagram of the above described modulating stage of my invention. The bandpass filter comprising inductances 61, 64 and 65 combined with capacitors 62, 63 and 66 has electrical parameters adapted to pass a signal in the zero to 495 cycle range. The next succeeding stage comprising inductances 67, 70 and 71 in combination with capacitors 68, 69 and 72 passes signals in the 505 to 995 cycle frequency range. Each succeeding stage is similar and the combination of all said stages comprises filter 21 as illustrated in FIGURE 4. The output of said filter 21 is fed to the combining network which comprises load resistors 81—87, isolating resistors 88—94, and amplifier tube 101. Harmonic generator 23 comprises the arrangement of triodes 111, 121 and four other similar triodes not shown, together with their associated filters and biasing voltages. The arrangement of resistors 119, 116, 126 and capacitors 117, 118, 127 as shown, comprises the equalizing network. The balanced modulator consisting of diodes 132—135 provides a carrier suppressed single sideband output to the transmitter.

Figure 7:
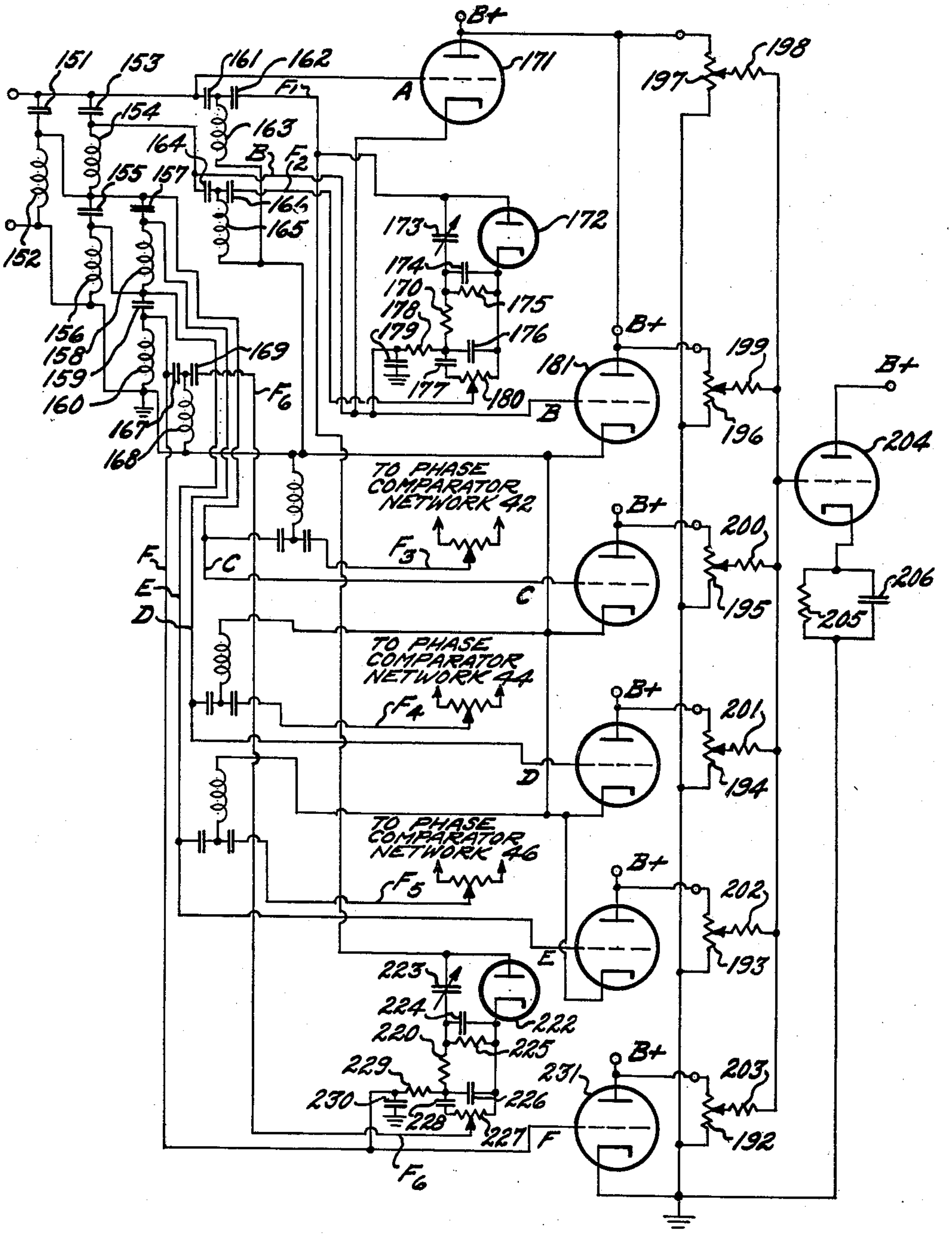
FIGURE 7 is a schematic diagram of the demodulator stage of my invention.

The schematic diagram of the demodulator stage of my invention is illustrated in FIGURE 7. The frequency separator comprises the circuit arrangement of capacitors 151, 153, 155, 157, 159 and inductances 152, 154, 156, 158, 160. Filter 33 of FIGURE 5 comprises capacitors 161, 162 and inductance 163. These elements have parameters adapted to provide a high pass filter, thereby allowing only the 500 cycle control signal to be supplied to phase-and-amplitude comparator 40. The arrangements of filters 34—38 are similar. The phase and comparator networks are all similar to the circuit combination of resistors 175, 178, 180, capacitors 173—174, 176, 177, 179 and diode 172. Combiner 51, as illustrated in FIGURE 5 comprises the arrangement of resistors 192—203, as illustrated.

While it has been shown and described what is considered at present to be a preferred embodiment of the invention, modifications thereto will readily occur to those skilled in the art. It is not therefore desired that the invention be limited to the specific arrangement shown and described, and it is intended to cover in the appended claims all such modifications that fall within the true spirit and scope of the invention.

What is claimed is:

1. In a radio communication system, a method for compensating for signal phase and amplitude distortion due to ionospheric scatter effects comprising the steps of dividing the signal to be transmitted into a plurality of discrete frequency bands, providing, for each discrete frequency band, a control signal, said control signals being harmonically related and of equal phase and amplitude, each said control signal having a frequency that is compatible with the lowest frequency of its associated frequency band, combining said control signals with said signal to be transmitted, transmitting said composite signal to a remotely located receiver, re-dividing said received signal into its discrete frequency bands, comparing the control signals associated with each said discrete frequency band with the lowest frequency control signal, and altering the phase and amplitude of the received signal at said discrete frequency bands in response to any deviation between said control signals.

2. A method for compensating for signal phase and amplitude distortion due to ionospheric scatter effects as defined in claim 1 wherein said signal to be transmitted is divided into frequency bands of 0 to 495 cycles, 505 to 995 cycles, 1,005 to 1,495 cycles, 1,505 to 1,995 cycles, 2,005 to 2,495 cycles, 2,505 to 2,995 cycles and 3,005 to 3,500 cycles.

3. A method for compensating for signal phase and amplitude distortion due to ionospheric scatter effects as defined in claim 2 wherein the control signal associated with said 505 to 995 cycle frequency band has a frequency of 500 cycles, the control signal associated with said 1005 to 1495 cycle frequency band has a frequency of 1000 cycles, the control signal associated with said 1505 to 1995 cycle frequency band has a frequency of 1500 cycles, the control signal associated with said 2005 to 2495 cycle frequency band has a frequency of 2000 cycles, the control signal associated with said 2505 to 2995 cycle frequency band has a frequency of 2500 cycles, and the control signal associated with said 3005 to 3500 cycle frequency band has a frequency of 3000 cycles.

4. In a radio communication system, apparatus for compensating for signal phase and amplitude distortion due to ionospheric scatter effects comprising means for dividing the signal to be transmitted into a plurality of discrete frequency bands, means for providing a control signal for each discrete frequency band, said control signals being harmonically related and of equal phase and amplitude, each said control signal having a frequency that is compatible with the lowest frequency of its associated frequency band, means for combining said control signals with said signal to be transmitted, means for transmitting said composite signal to a remotely located receiver, means for re-dividing said received signal into its original discrete frequency bands, means for comparing the control signals associated with each said discrete frequency band with the lowest frequency control signal, and means for altering the phase and amplitude of the received signal at said discrete frequency bands in response to any deviation between said control signals.

References Cited in the file of this patent

UNITED STATES PATENTS

| | | |
|---|---|---|
| 1,766,050 | Young | June 24, 1930 |
| 1,998,792 | Sedlmayer | Apr. 23, 1935 |
| 2,640,880 | Aigrain et al. | June 2, 1953 |
| 3,023,309 | Foulkes | Feb. 27, 1962 |